United States Patent

[11] 3,628,154

[72] Inventor  Lawrence R. Weill
             455 Point Loma Ave, San Diego, Calif. 92107
[21] Appl. No. 733,463
[22] Filed    May 31, 1968
[45] Patented Dec. 14, 1971

[54] LOW DISTORTION SIGNAL BAND SHIFTING WITH ON-OFF SWITCHES
     7 Claims, 3 Drawing Figs.
[52] U.S. Cl. .................................... 325/435,
         325/436, 325/437, 325/442, 328/16, 328/167
[51] Int. Cl. .................................... H04b 1/26,
                                                H03b 1/04
[50] Field of Search ........................... 325/430,
         431, 432, 434, 435, 436, 437, 438, 439, 442, 443,
         123; 307/271; 328/15, 16, 167

[56]            References Cited
           UNITED STATES PATENTS
1,647,609  11/1927  Cotter ........................ 325/434
2,621,289  12/1952  Gray .......................... 325/430
3,399,278   8/1968  Dahlman ...................... 179/15
3,411,110  11/1968  Walker ........................ 332/17

Primary Examiner—Richard Murray
Assistant Examiner—James A. Brodsky
Attorneys—Louis A. Miller, Paul N. Critchlow, John W. McLaren and Truman L. Styner ABSTRACT: Simple switches are used for shifting a signal band, $f_0$, to a new location, $f_0+f_1$, without distortion. The band is split into two opposed phases, chopped with square waves of frequencies $f_1$ and odd harmonies $3f_1$, $5f_1$, etc., which are weighted in amplitude by the factors 1, one-third, one-fifth, etc., and are finally added. Unwanted components $3f_1$, $5f_1$, etc., are found to be easily canceled, obviating a difficult filtering problem.

Patented Dec. 14, 1971

INVENTOR.
LAWRENCE R. WEILL
BY
ATTORNEYS

LOW DISTORTION SIGNAL BAND SHIFTING WITH ON-OFF SWITCHES

The invention described herein may be manufactured and used by or for the Government of the United States of America for governmental purposes without the payment of any royalties thereon or therefor.

BACKGROUND

The process of heterodyning is commonly used in radio telemetry and other forms of data transmission to frequency-shift the frequency spectrum of time-varying signals from one spectral region to another. Preservation of the spectral characteristics requires the high-accuracy analog multiplier for combining the signal spectrum with a locally generated frequency. Even though analog multipliers may be quite expensive they do not always have the required accuracy. In sonar signals, for example, it may be necessary to analyze the signal spectrum for an obscure ship's "signature," and the spectrum might be shifted from some subaudible range to a higher frequency range without losing any of the information in the spectrum. This means that there can be no distortion in either phase or frequencywise. In another case, signals on tapes running at different speeds may be shifted to a common time base to permit processing in a correlator. Whether the frequency shift is large or small, there is the ever present problem of crossover of sidebands produced by different multiples of the local oscillator frequency.

The object of this invention is to provide an improved heterodyne that will shift a signal spectrum without phase or frequency distortion and which is inexpensive to make and simple to operate.

SUMMARY

A band of signal frequencies having a center frequency $f_o$ is split in phase to produce two phase-opposed signal bands in separate circuits. A local wave of frequency $f_1$, which is equal to the desired shift, is generated as well as odd numbered multiples, $3f_1$, $5f_1$, etc., and each frequency drives a switch that connects alternately the phase-opposed signals to the output circuit after they have been weighted in amplitude by factors, respectively, of 1 one-third, one-fifth, etc. Unwanted sideband components within the wanted spectrum as effectively canceled by adding to the output a phase-opposed equivalent of the unwanted component. Frequency filtering is thus obviated.

Other objects and features of this invention will become apparent to those skilled in the art by referring to the preferred embodiments described in the following specification and shown in the accompanying drawing in which.

Figure 1:
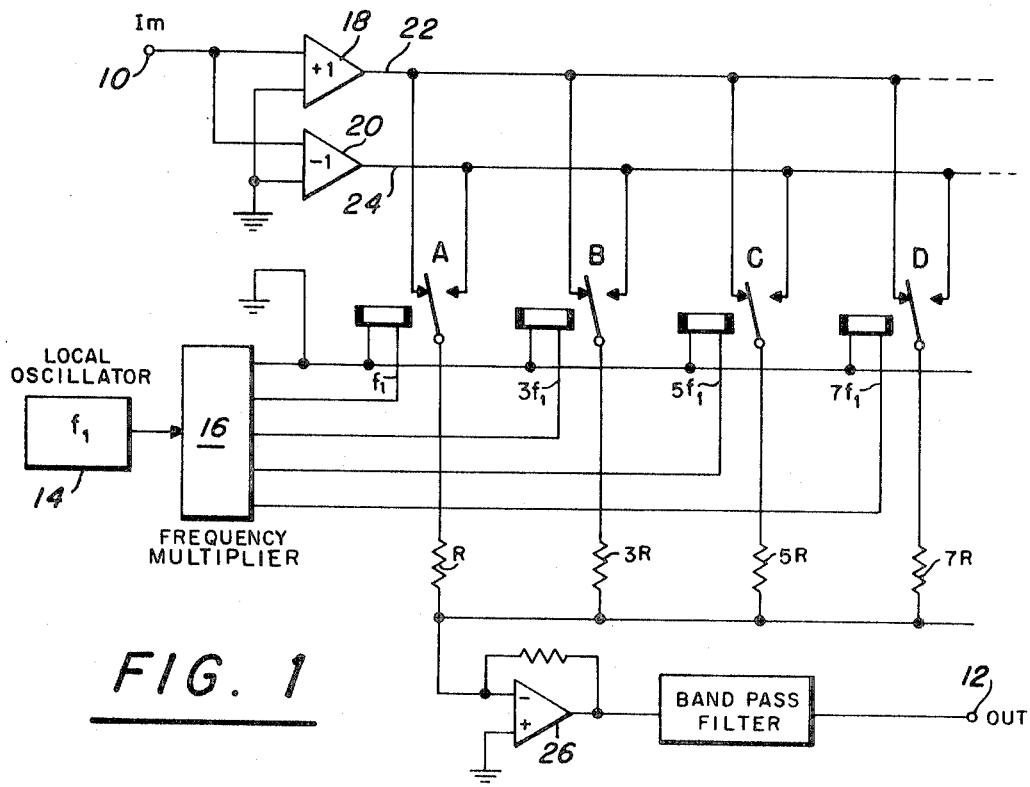
FIG. 1 shows a schematic circuit diagram of one embodiment of this invention.
Figure 3:
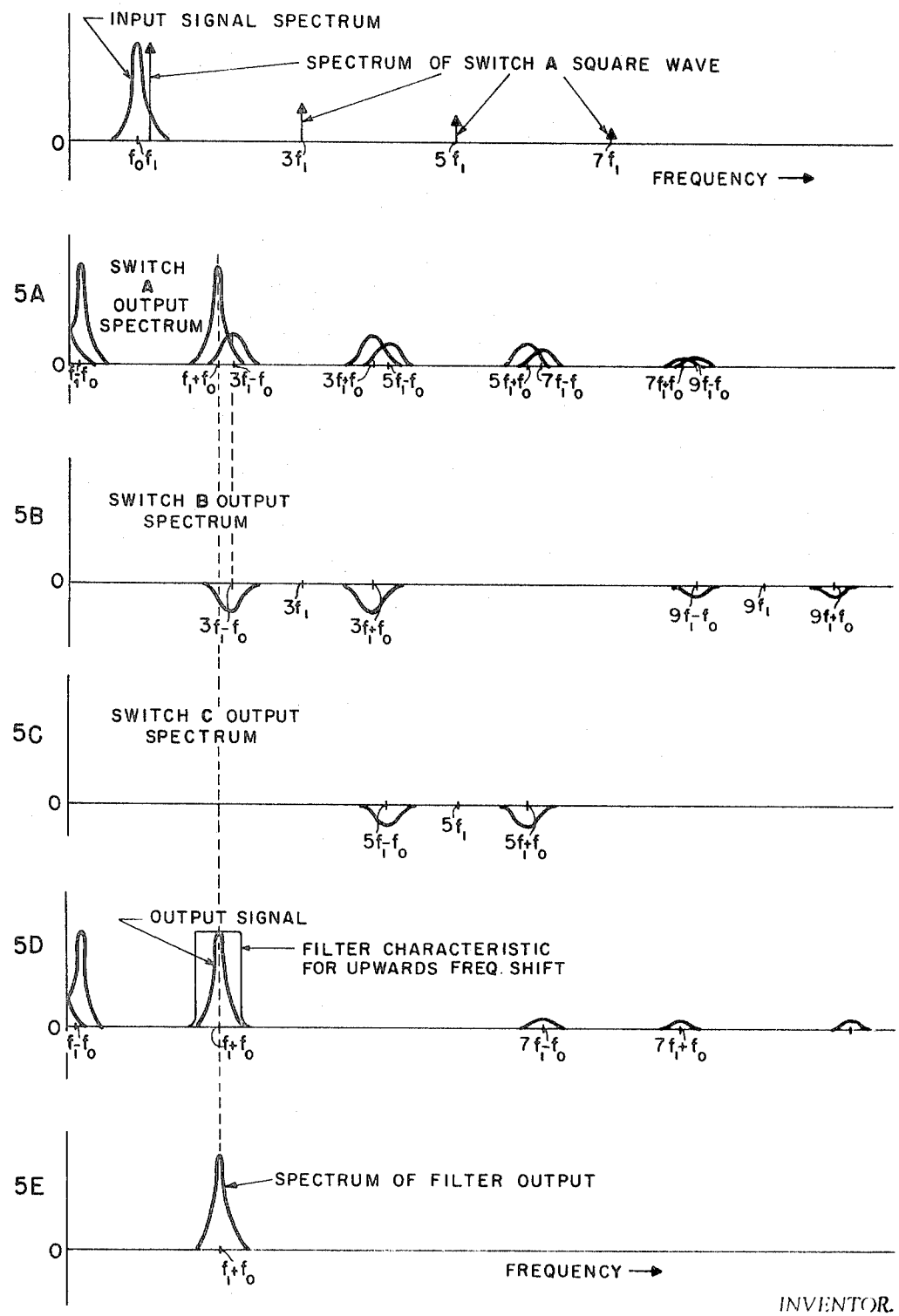
FIG. 3 shows spectrum diagrams on a common time base of principal signal voltages in the system of FIG. 1.

While it is contemplated that the switching circuits of FIG. 1 should be solid state devices, the equivalent electromechanical switches are illustrated for ease of description. As will appear, the input signal spectrum at input terminal 10 with a center frequency $f_o$ will be shifted in frequency by an amount $f_1$ and applied to the output terminal 12. That is, the spectrum with center frequency $f_o$, shown on the top line of FIG. 3, is to be shifted to $f_1+f_o$, shown on the bottom line of FIG. 3.

According to this invention, the local frequency $f_1$ is generated by the clock generator 14, FIG. 1, and is square or binary in nature. As shown in FIG. 1, the frequency $f_1$ is increased by integral multiples in multiplier 16. The multiples of a square wave of frequency $f_1$ of interest here are odd numbered, $3f_1$, $5f_1$, etc. Although square wave switching of the signal preserve the spectral content of the signal to a high degree, because electronic switching can be made very nearly ideal, there are disadvantages to this technique of heterodyning. Spectral overlay occurs under certain conditions as is shown in FIG. 3 where sidebands created by at least one multiple of the local oscillator may overlap the desired band at the output. When the desired and undesired frequencies overlap, no amount of filtering will isolate the wanted signals. This overlay occurs whenever an integral multiple of the shifting frequency $f_1$ falls inside the signal spectrum.

According to this invention, the problem of overlap is eliminated while retaining the advantages of the low-cost simple switching type mixer.

The input signal is applied to a phase splitter such as the amplifiers 18 and 20 with positive and negative gain, respectively, to divide the signal and apply to bus bars 22 and 24 phase-opposed replicas of the input spectrum. Each bus bar is connected to like contracts of the single pole, double throw switches A, B, C, and D. The actuating electromagnets for the several armatures of the switches are driven, respectively, at frequencies $f_1$, $3f_1$, $5f_1$, and $7f_1$. Conveniently, these related frequencies are obtained from multiplier 16 connected to the local oscillator or clock generator 14. If desired the frequency of the local oscillator may be well above the range of switching frequencies and a binary divider used at 16.

The output of each vibrating switch is applied in appropriate proportion to the operational amplifier 26. That is, the output of each switch A, B, C, and D is appropriately attenuated and additively applied to the input of the amplifier. The attenuation is effected in resistances or linear impedances R, 3R, 5R, and 7R. The amplifier 26 is of the type employing considerable negative feedback so as to simulate infinite or very high-input impedance and reliably perform analog summations of applied voltages from many inputs.

In considering the operation of the circuits of FIG. 1, reference should be made to the waveforms of FIG. 3. It will be assumed that the switch structures are ideal in producing the square-cornered wave of FIG. 2. It further will be assumed switch A is vibrated at frequency $f_1$, and that $f_1$ falls within the boundaries of the input signal spectrum to be shifted. The input 1 is centered at $f_o$. A square wave of frequency $f_1$ added as a modulation component to the signal is certain to produce modulation products containing odd-numbered multiples or harmonics of $f_1$, such as $3f_1$, $5f_1$, etc. It has been shown that the amplitudes of the harmonic components are, respectively, one-third, one-fifth, etc. of the fundamental $f_1$ as shown on the top line of FIG. 3.

Unfortunately, each harmonic produces a pair of sidebands with the input signal. As shown on line 5A of FIG. 3, several harmonics are combined with the input signal to produce upper and lower sidebands. If the wanted band is $f_1+f_o$, it will be overlapped by the lower sideband, $3f_1-f_o$, of the first harmonic.

Lines 5B and 5C, respectively, show the spectrum at the output of switches B and C. The spectra of switches B and C are inverted because the spectral components are 180° out of phase with the corresponding components of the output of switch A on line 5A. Note that at time zero, and each $T_1$ interval thereafter, in the square waves of FIG. 2, waves B and C are of one phase and opposite the phase of wave A. Reversing switches, not shown, may be provided in the leads to the electron inputs to facilitate selection of the phase at each switch in accordance with the timing diagram, FIG. 2.

It is significant that the $3f_1-f_o$ component of the signal at the output of switch B can be made identical in amplitude with the corresponding opposed-phase component at the output of switch A, by the mere adjustment of the values of adding resistors R and 3R. Thus, the unwanted component $3f_1-f_o$ in the wanted output channel is perfectly canceled. The wanted channel $f_1+f_o$ in this case appears at the output terminal 12. All other undesired frequency components are well removed from the desired channel and are easily eliminated by simple filters. Although switch C is not required in the example shown, switch C as well as switch D were included to show that the elimination of troublesome higher order spectral components is merely a matter of adding switches driven at odd multiples of the rate of switch A. It is possible by adding enough switches to completely eliminate all higher order spectral components below any given frequency.

Mathematical analysis of the system of FIG. 1 becomes simple if it is assumed that the input signal, $S(t)$, is a cosinusoid given by $$S(t) = \cos 2\pi f_0 t \quad (1)$$

Such a simple expression can be extended to the case where the signal $S(t)$ is the sum of a large number of sinusoids of arbitrary frequency and phase.

Figure 2:
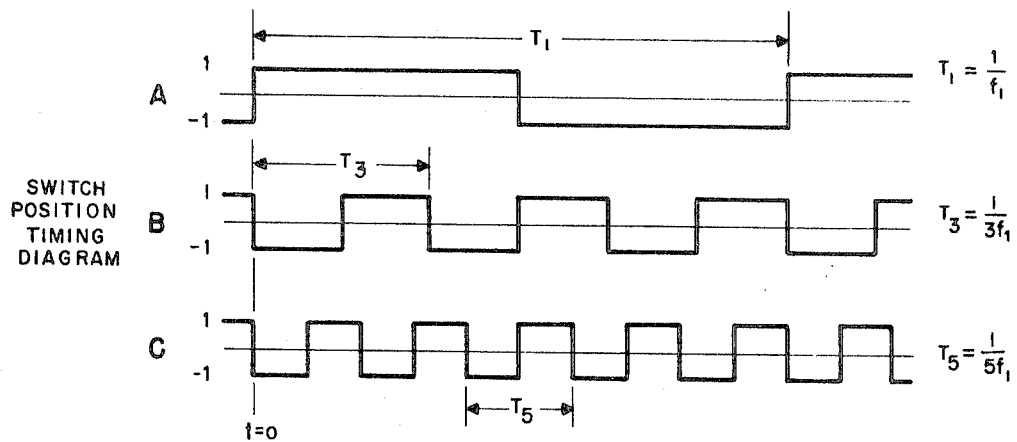
FIG. 2 is a switch position timing diagram of the switches of FIG. 1.

Switch A of FIG. 1 effectively multiples $S(t)$ by the function shown at A in the switch position timing diagram of FIG. 2. This switch function, $f_A(t)$, has the Fourier series representation $$f_A(t) = \frac{4}{\pi} \sum_{k=1}^{\infty} \frac{(-1)^{k+1} \cos 2\pi (2K-1) f_1 t}{2K-1} \quad (2)$$

where $K$ is the number of the harmonic considered. Inspection of equation (2) of this series reveals that the spectrum of the square wave $f_A(t)$ consists of frequencies that are odd multiples of the frequency $f_1$. The amplitude of the $n$th harmonic of $f_1$ is $4/n$ where $n=1, 3, 5, 7$, etc. When the input signal $S(t)$ is multiplied by the square wave $f_A(t)$ there is obtained $$s(t) f_A(t) = (\cos 2\pi f_0 t) \left[ \frac{4}{\pi} \sum_{k=1}^{\infty} \frac{(-1)^{k+1} \cos 2\pi (2k-1) f_1 t}{2K-1} \right] \quad (3)$$

multiplying the terms yields $$s(t) f_A(t) = \frac{2}{\pi} \sum_{k=1}^{\infty} \frac{(-1)^{k+1}}{2K-1} \{\cos 2\pi[(2k-1)f_1 + f_0]$$
$$+ + \cos 2\pi[(2K-1)f_1 - f_0] t\} \quad (4)$$

For each harmonic number, $K$, in the summation, the two terms in the brackets represent upper and lower sidebands centered around the frequency odd-numbered multiple $(2K-1)f_1$. In a similar manner, there can be derived the output of switch B where, in the example of FIG. 1, $K$ is 3 and the amplitude is one-third. As explained above it is preferred that the products of the square wave and the signal $s(t)$ be attenuated in the adding resistors, R, 3R, 5R, etc.

What is claimed is:
1. The method of shifting a band of frequencies, having a center frequency $f_o$, from $f_o$ to a new wanted spectrum centered at $f_o \pm f_1$, said method comprising the steps of;
    splitting the phase of said band to produce two phase-opposed replicas of said band in separate circuits,
    locally simultaneously generating harmonically related phase coherent square waves of frequencies $f_1$ and $nf_1$, where $n$ is an odd integral number,
    alternately feeding said phase-opposed replicas to an output circuit at said frequency $f_1$ to produce modulation products $f_1 \pm f_o$,
    alternately feeding said phase-opposed replicas to said output circuit at said frequency $nf_1$, to produce modulation products $nf_1 \pm f_o$,
    weighting the amplitudes of the two modulation products, respectively, by factors of 1 and $1/n$, and
    adding together the weighted signals so that unwanted higher-order spectral components of the mentioned modulation products which overlap the wanted output spectrum are canceled.

2. A system for shifting a predetermined amount a band of signals having the center frequency, $f_o$, to a new wanted band centered at $f_o \pm f_1$ said system comprising;
    means for locally simultaneously generating a wave containing frequency $f_1$ and a predetermined integral multiple, $nf_1$, thereof, where $n$ is any odd whole number,
    phase-splitting means for simultaneously producing in separate circuits opposed phases of said band of signal frequencies,
    an output circuit,
    means connected to the mentioned local generating means and responsive to said frequency $f_1$ for alternately connecting said opposed phases from said separate circuits to said output circuit at frequency $f_1$,
    means connected to the mentioned local generating means and responsive to said frequency $nf_1$ for alternately connecting said opposed phases from said separate circuits to said output circuit at frequency $nf_1$, and
    means for weighting the $f_1$-connected and the $nf_1$-connected phases by factors, respectively, of 1 and $1/n$, and for algebraically adding the weighted signals so that unwanted multiplication products appearing in the wanted output band are cancelled.

3. In the system defined in claim 2;
    means for generating a plurality of odd-numbered integral multiples of frequency $f_1$, and
    means responsive to each multiple for alternately switching said opposed phases to said output circuit.

4. In the system defined in claim 3;
    means for attenuating each switched signal to an amplitude of $1/n$, where $n$ is the number of said odd-numbered multiple.

5. In the system defined in claim 2, said local generating means comprising;
    an oscillator for frequency $f_1$, and
    a multiplier for simultaneously generating a plurality of odd-numbered multiples.

6. In the system defined in claim 2, said phase-splitting means comprising;
    two amplifiers with inputs connected in parallel to said source of signals, and outputs connected, respectively, to said separate circuits, and
    said amplifiers having gains, respectively, of $+1$ and $-1$ to produce said opposed phase signals.

7. In the system defined in claim 2, said adding means comprising;
    an operational amplifier having an apparent infinite input impedance, and
    resistors connected between the amplifier input and, respectively, $f_1$-connecting and the $nf_1$-connecting means, said resistors having, substantially, values of R and $n$R.

* * * * *